Oct. 12, 1937.   F. N. BARD   2,095,728
BALL JOINT
Filed Sept. 8, 1936   2 Sheets-Sheet 1
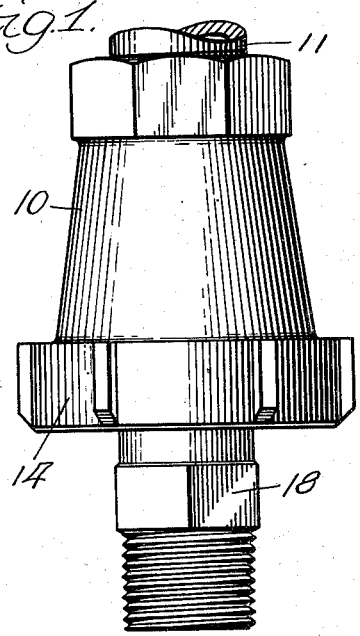
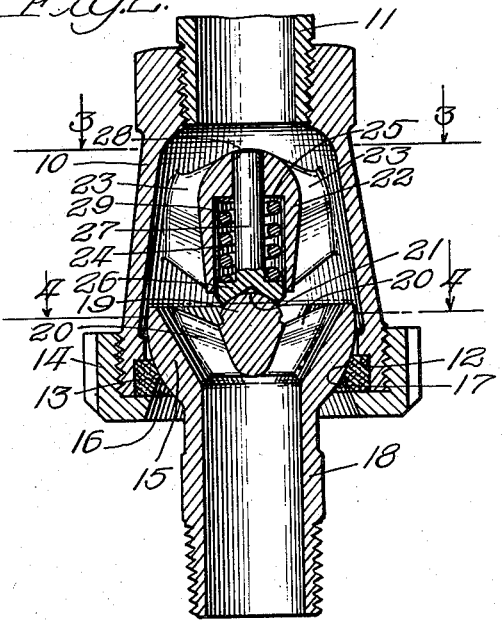
Inventor:
Francis N. Bard, Oct. 12, 1937. F. N. BARD 2,095,728
BALL JOINT
Filed Sept. 8, 1936 2 Sheets-Sheet 2

Inventor:
Francis N. Bard,
By Dyrenforth, Lee, Chritton & Wiles,
Attys.

Patented Oct. 12, 1937

2,095,728

UNITED STATES PATENT OFFICE 2,095,728

BALL JOINT

Francis N. Bard, Highland Park, Ill., assignor to Barco Manufacturing Company, a corporation of Illinois Application September 8, 1936, Serial No. 99,825

3 Claims. (Cl. 285—95)

This invention relates to a flexible joint, and more particularly to a ball joint for use in fluid conduits.

Figure 6:
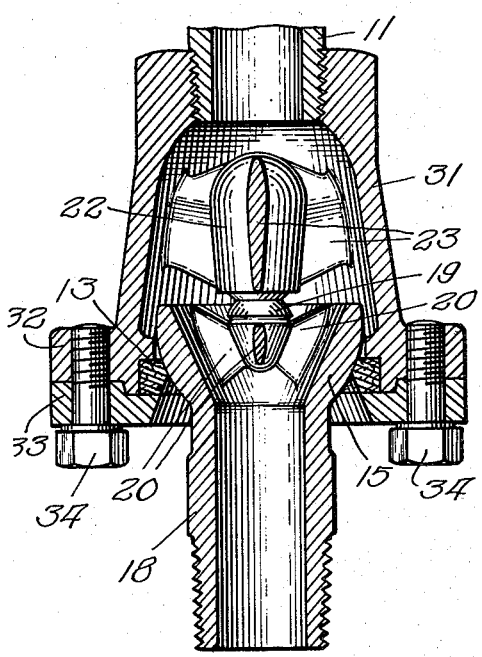
Figure 8:
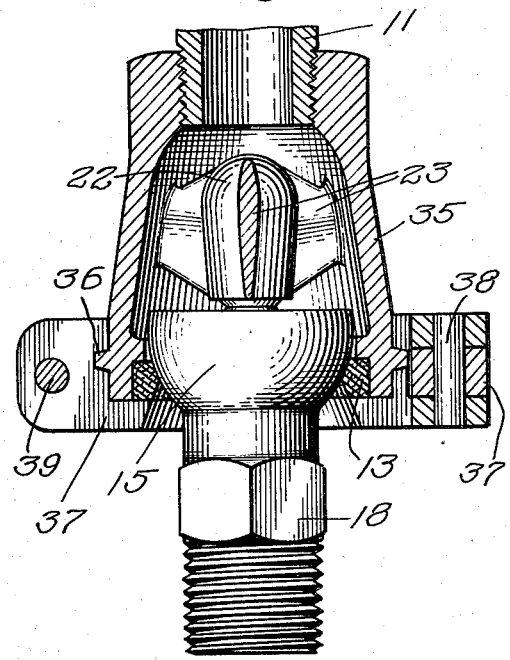
Figure 7:
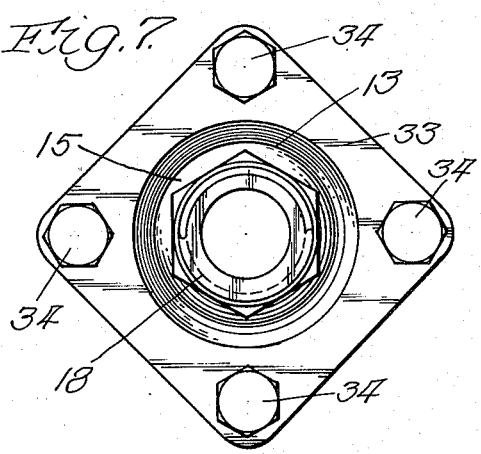
Figure 9:
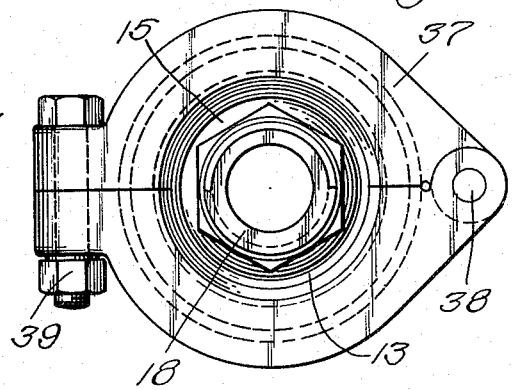
Figure 10:
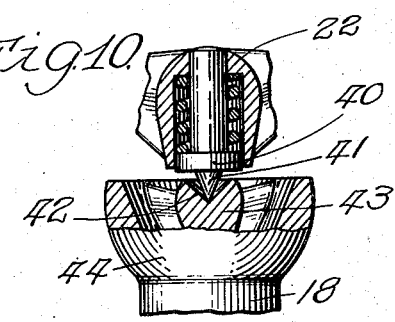

One feature of this invention is that uniformly distributed sealing pressure is at all times maintained between the ball and the retaining member therefor; another feature of this invention is that sealing force is exerted at substantially the center of the ball; yet another feature of this invention is that the frictional resistance to flexing is substantially reduced; still another feature of this invention is that a relatively small spring exerting a large force may be used; a further feature of this invention is that substantially no resistance to fluid flow is interposed by the joint construction; other features and advantages of this invention will be apparent from the following specification and the drawings, in which:

Figure 1 is a side elevation of a joint embodying this invention; Fig. 2 is a vertical sectional view of the same joint; Fig. 3 is a horizontal view, partly in section, along the line 3—3 of Fig. 2; Fig. 4 is a horizontal view, partly in section, along the line 4—4 of Fig. 2; Fig. 5 is a detailed sectional view of a modified form; Fig. 6 is a vertical sectional view of another form; Fig. 7 is a bottom plan of the device shown in Fig. 6; Fig. 8 is a vertical view, partly in section, showing another modification; Fig. 9 is a bottom plan view of the structure shown in Fig. 8; and Fig. 10 is a fragmentary view, partly in section, of a further modification of this invention.

Ball joints for fluid conduits have long been known and used, but many difficulties have been experienced therewith. One of the difficulties commonly encountered is that when the joint is flexed to an angular position the sealing pressure between the ball and the annular retaining member is less on one side than the other, with frequent leakage of fluid on the side on which the least pressure is exerted, and excessive wear on the ball surface and retaining member on the side on which the greater pressure is exerted. Another difficulty frequently encountered, especially where a high spring pressure is used in conjunction with a bearing member contacting a surface of the ball in order to insure a fluid tight seal even when the joint is flexed, is an excessively high resistance to flexing of the joint, causing an unnecessary absorption of power and wear on the parts. Where one gasket has been in use for a considerable period and has been worn down quite a little, moreover, it is frequently found that the spring will not take up the necessary movement and yet retain a fluid tight seal.

The present invention obviates these and other objections by providing a socket member having an annular retaining member, a ball member adapted to be retained in said socket by the annular member, and novel means of applying force to seal the ball member against the annular member. This means comprises a bearing surface or member substantially at the center of the ball, and a pressure device located substantially centrally in the socket member adjacent the bearing member, the pressure device comprising a housing having a spring therein adapted to exert force on the bearing member of the ball.

The fact that the spring is located at the center of the socket member enables it to be made of relatively small diameter wire and coils. Where a spring of large diameter coils is used, as in conventional types, the diameter of the wire must be rather large in order to secure the desired sealing pressure. Locating the pressure spring of this invention in a housing, moreover, protects it from the erosive effect of high velocity fluids passing through the flexible joint. This errosive effect has proved objectionable in the common commercial joints, since no satisfactory steel or rust-resisting coating has been found which would stand up under the erosion.

In the particular embodiment of this invention illustrated in Figs. 1 to 4 a socket member 10 is threaded on a pipe or conduit section 11. The socket member 10 is provided near the open end thereof with an annular shoulder 12 adapted to have an annular retaining member or gasket 13 in contact therewith. A gland member 14 is here shown as threaded onto the outside of the bottom of the socket member 10, and the gasket 13 as being so proportioned that when the gland member is drawn up tight against the bottom of the socket member the gasket is flush with said bottom and is in contact with the shoulder 12. A ball member 15 is shown having a substantially hemispherical outer surface 16 adapted to contact the surface 17 of the gasket 13, and to be held in sealing engagement therewith. The ball member is provided with a neck 18, here shown as a male member, adapted to be threaded into another conduit section not here shown.

The ball member 15 has located therein at substantially the center thereof a bearing member 19, which member is held in place by a spider comprising radial arms or supporting struts 20. This bearing member has on the upper portion thereof a bearing surface 21 of substantially hemispherical shape, the center of the arc of this bearing surface coinciding with the center of that of the outer surface of the ball 15 adapted to contact the gasket.

The socket member 10 has centrally disposed in the socket thereof adjacent the bearing member 19 spring supporting means or a spring housing 22, this housing being held in place removed from the walls of the socket by a spider comprising radial arms or supporting struts 23. The housing 22 has a substantially cylindrical opening 24 therein with a shoulder 25 at the end thereof removed from the bearing member 19. A pressure member 26 is provided having a surface adapted to contact the bearing surface 21 on the bearing member 19. This pressure member 26 is adapted to be a sliding fit in the cylindrical opening 24 in the housing 22, and it is provided with a stem 27 of reduced diameter extending up and making sliding contact with a bearing opening 28 provided therefor in the top of the spring housing. A spring 29 is adapted to lie within the cylindrical opening 21, surrounding the stem 27, abutting at one end against the shoulder 25 and at the other end against the pressure member 26. Thus a force is exerted against the bearing member 19 of the ball, forcing it into sealing engagement with the gasket or retaining member 13.

The construction disclosed provides a sealing force exerted effectively at the center of the ball member. This force, since it is applied at substantially the center of the ball, is distributed evenly about the outer surface thereof and results in equal sealing pressure between the outer surface 16 of the ball and the gasket 13 at all points therearound. This is true whether the neck 18 is in the position shown, or flexed to one side or the other, since the bearing surface 21 is substantially hemispherical with a center coinciding with that of the ball, so that force exerted by the spring 29 is always exerted effectively at the center of the ball, and thus distributed evenly around the gasket in any position of the ball. It will be noted that there is no distortion of the spring when the neck 18 is flexed to one side, and no possibility of lesser pressure on one side of the gasket than on the other. Any pressure exerted by the fluid passing through the conduit is, of course, always evenly distributed about the gasket, since the area of the projected circle at the point of contact does not change with movement of the ball.

The application of sealing force at substantially the center point of the ball, moreover, has another important result in addition to even sealing of the ball against the annular gasket. With this construction the force necessary to flex the joint is materially reduced, and is substantially the same at all points in the range of motion thereof. In joints now in common use the sealing pressure applied by a spring bearing against the ball near the outer surface thereof is generally considerably in excess of that necessary when the joint is in normal position in order to insure a sufficient seal when the joint is flexed to its limit at one side or the other; and the uneven pressure on opposite sides of the gasket when the joint is flexed opposes increased resistance to movement thereof. The construction disclosed herein is thus particularly adapted for maintaining proper sealing contact between the ball and the gasket irrespective of fluid pressure in the conduit, since a sealing spring of considerable strength may be readily used without obstructing the flow of fluid, causing uneven ball and gasket wear, or too high a resistance to flexing.

Since the spring supporting means or housing 22 and the bearing member 19 are substantially centrally disposed in the flexible joint and coaxial with the flow path of the fluid through the conduit, it is preferable to have them interpose as little resistance as possible to such fluid flow. The outer shape of the housing and bearing member is so proportioned that the combination forms a substantially streamlined object, so that no eddies or turbulence is caused in the fluid flowing through the conduit. This is accomplished by having the housing bluntly rounded at the top and tapered downwardly and inwardly toward the bearing member, and constructing the bearing member to taper inwardly slightly more sharply, the diameters of the two members adjacent each other being such that a substantially smooth transition is had from one to the other. The effective shape of the combination is thus substantially that of a tear drop, so that smooth flow of the fluid from the socket member to the ball member past this streamlined shape is facilitated. The radial struts 20 and 23, moreover, are very narrow in a direction transverse to the fluid flow, so that they interpose practically no resistance to the flow and do not create undesirable turbulence.

In the particular embodiment shown in Fig. 5, the spring housing 22 has no opening through the upper part thereof, and no pressure member 26 is used. In this form of the device a spring 30 located within the housing 22 bears directly against member 19, the spring being adapted to move about on the hemispherical bearing surface 20 as the joint is flexed, so that the pressure is always exerted in a direction coaxial with the housing 22. This construction enables the elimination of one piece, with consequent reduced manufacturing costs.

The structure illustrated in Figs. 6 and 7, and that illustrated in Figs. 8 and 9, disclose two further ways of retaining the gasket 13 in the socket member. In both of these forms, as in the preferred form of the invention shown in Fig. 2, the bottom edge of the gasket is drawn up flush with the bottom edge of the socket member. This is possible because it is not necessary to take up gasket wear at this point. In the common ball joint construction now known and used wear at the bearing surface of the gasket, caused by flexing of the ball member, is taken up by forcing the gasket further up into the socket member. In the devices embodying this invention the gasket is permanently placed in the socket and wear is compensated for by permitting the ball to move slightly downwardly. The construction used, with a small spring having a plurality of coils exerting force at substantially the center of the ball, enables this motion of the ball without objectionable results in the way of loss of spring pressure and poor sealing between the outer surface of the ball and the gasket.

In the particular construction shown in Figs. 6 and 7, a socket member 31 is used having a flange portion 32 at the bottom thereof. A coinciding or similarly shaped base plate 33 is used to hold the gasket 13 in place, the plate 13 being drilled and the flange 32 tapped to receive holding studs or bolts 34.

In the modification shown in Figs. 8 and 9, the socket member 35 has an outward annular projection 36 extending therearound. Holding means for the gasket 13 is provided which here consists of two substantially semicircular members 37 pivotally secured together at one side by the pin 38, and adapted to be drawn together about the projection 36 by the bolt 39 at the other end thereof. Here also the bottom of the socket member 35 and that of the gasket 13 are flush, no provision for take up being necessary at this point.

Fig. 10 shows a further modification of this invention wherein the advantages of center point pressure are realized to the full. In this form the pressure member 40 has a substantially conical point 41 adapted to be received by a conical depression 42 in the bearing member 43. The bottom of the conical depression 42 is at the center of the outer hemispherical surface 44 of the ball so that point pressure is exerted at the true center of the ball member.

While I have described and claimed certain embodiments of my invention it is to be understood that it is capable of many modifications. Changes therefore in the construction and arrangement may be made without departing from the spirit and scope of the invention as disclosed in the appended claims in which it is my intention to claim all novelty inherent in my invention as broadly as permissible in view of the prior art.

I claim:

1. A flexible joint of the character comprising a socket element having an annular retaining portion and a ball element adapted to be received by said socket element and retained in movable sealing engagement with said annular portion by the pressure of a spring, including: a spider in one of said elements; a second spider in the other of said elements; a bearing member at the central point of said ball element carried by said first-mentioned spider; and a support for said spring, closely adjacent said bearing member, said support being carried by said second spider and, together with said bearing member, forming a central pressure unit presenting a substantially streamlined shape to fluid flowing through said joint.

2. A joint of the character claimed in claim 1, wherein said spiders are narrow transverse to the direction of flow through said joint and said bearing member has an elongated tapered portion in the direction of flow forming the tail of said streamlined pressure unit.

3. A pressure unit for a flexible joint of the character comprising a socket element having an annular retaining portion and a ball element adapted to be received by said socket element and retained in movable sealing engagement with said annular portion, including: a spider in said ball element; a bearing member supported by said spider having a convex bearing surface at the central point of said ball element and a tapering portion; a pressure member adapted to contact said bearing surface; a spring adapted to urge said pressure member toward said surface; a second spider in said socket element; and a housing for said spring serving as a bearing for said pressure member at two spaced points, said housing being supported by said second spider closely adjacent said bearing member and co-operating therewith to present a substantially streamlined shape to fluid flowing through said joint.

FRANCIS N. BARD.